United States Patent
Matsuda

(10) Patent No.: US 7,006,418 B1
(45) Date of Patent: Feb. 28, 2006

(54) OPTICAL DISK DEVICE THAT MONITORS CHIP TEMPERATURE OF A DRIVE AND CONTROLS ITS OPERATION BASED ON THE CHIP TEMPERATURE

(75) Inventor: Yuji Matsuda, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 734 days.

(21) Appl. No.: 09/914,593

(22) PCT Filed: Jun. 29, 2000

(86) PCT No.: PCT/JP00/04275
§ 371 (c)(1),
(2), (4) Date: Nov. 7, 2001

(87) PCT Pub. No.: WO01/01412
PCT Pub. Date: Jan. 4, 2001

(30) Foreign Application Priority Data

Jun. 29, 1999 (JP) ................. 11-183738

(51) Int. Cl.
G11B 7/00 (2006.01)

(52) U.S. Cl. .............. 369/53.43; 369/53.42; 369/44.25; 369/44.32; 720/695

(58) Field of Classification Search ............ 369/53.12, 369/53.13, 53.18, 53.37, 53.42, 53.43, 53.45, 369/44.25, 44.32
See application file for complete search history.

(56) References Cited

U.S. PATENT DOCUMENTS 5,274,622 A * 12/1993 Kono ..................... 369/116
5,331,615 A * 7/1994 Yamada et al. .......... 369/44.32
5,398,227 A * 3/1995 Miyaoka et al. .......... 369/116
5,416,648 A * 5/1995 Jeppson et al. .......... 360/73.02
5,621,710 A * 4/1997 Koo ......................... 369/47.4
5,790,511 A * 8/1998 Juso et al. ................. 720/671
6,130,868 A * 10/2000 Yamamoto ................. 369/53.3
6,160,676 A * 12/2000 Takaishi .................. 360/78.05

FOREIGN PATENT DOCUMENTS

JP 63269376 A * 11/1988

(Continued)

OTHER PUBLICATIONS

Translation of Hachi (JP 2000090563 A).*

(Continued)

Primary Examiner—Brian E. Miller
Assistant Examiner—Peter Vincent Agustin
(74) Attorney, Agent, or Firm—Wenderoth, Lind & Ponack, L.L.P.

(57) ABSTRACT

Monitor circuits monitor junction temperatures of chips of driver ICs which drive a driving part of a recording/reproduction system. Comparison circuits compare the junction temperatures with respective arbitrarily set temperatures to output temperature flags as comparison results and are included in the driver ICs. A CPU monitors the temperature flags to confirm febrile states of the respective driver ICs, thereby performing a control so as to continue to drive an optical disk device when the junction temperatures of the chips of the driver ICs are lower than the set temperatures, and to suppress heat generation of the respective driver ICs when the temperatures are equal to or higher than the set temperatures. The so-constituted optical disk device can perform a control so as to effectively suppress heat generation before driving of the optical disk device is impeded by heat generation of the driver ICs which drive the recording/reproduction driving system of the device, thereby performing a fast and stable operation within allowable capacities of the driver ICs.

8 Claims, 1 Drawing Sheet

FOREIGN PATENT DOCUMENTS

| | | | |
|---|---|---|---|
| JP | 01292667 A | * | 11/1989 |
| JP | 2-013224 | | 1/1990 |
| JP | 02094027 A | * | 4/1990 |
| JP | 04129084 A | * | 4/1992 |
| JP | 5-61898 | | 8/1993 |
| JP | 06028701 A | * | 2/1994 |
| JP | 06162592 A | * | 6/1994 |
| JP | 9-265772 | | 10/1997 |
| JP | 11-16243 | | 1/1999 |
| JP | 2000-90563 | | 3/2000 |

OTHER PUBLICATIONS

Translation of Ueki (JP 11016243 A).*

* cited by examiner

OPTICAL DISK DEVICE THAT MONITORS CHIP TEMPERATURE OF A DRIVE AND CONTROLS ITS OPERATION BASED ON THE CHIP TEMPERATURE

TECHNICAL FIELD

The present invention relates to an optical disk device and, more particularly, to a device that controls heat generation of a driver IC.

BACKGROUND ART

In the past several years, speeding-up of optical disk devices has proceeded, and 12×-speed CLV (Constant Linear Velocity) drives and maximum-24×-speed CAV (Constant Angular Velocity) drives have come along. With this speeding-up, allowable losses from heat become insufficient in conventional driver ICs, such as spindle driver ICs, actuator driver ICs and traverse driver ICs. This problem is dealt with by adding a heat dissipating plate or the like to a driver IC to control heat generation of the driver IC, arranging an air blowing means at an optical disk driving part to control heat generation as disclosed in Japanese Published Patent Application No. Hei. 9-265772, or employing a pattern design with a high heat radiation efficiency in PCB design, and in the case of an eccentric disk, by adopting a method of reducing the number of revolutions of the disk or the like.

Further, when there are constraint conditions on the driver IC, the heat dissipating plate for suppressing heat generation or the like cannot be added, and thus this problem is dealt with by using a driver IC of power package specifications whose allowable loss from heat is large or preventing the disk from being rotated at high speed.

In a case where the allowable loss of the driver IC due to heat is exceeded even though the above-described measures for suppressing heat generation are taken, in order to prevent the resultant breakdown of the driver IC or the like, the driver IC is provided with a thermal shutdown function, whereby the operation of the driver IC is stopped forcibly when the junction temperature as a chip temperature of the driver IC reaches a predetermined temperature.

However, when speeding-up of the optical disk device is to be further progressed in the future, the allowable loss of the conventional driver IC due to heat is insufficient, resulting in breakage of the driver IC. That is, due to the further speeding-up of the optical disk device, in partially with regard to eccentric disks or the like, it is required that the acceleration sensitivity of an actuator in a pickup should be increased more than ever, and face wobbling or eccentricity of a disk becomes more serious with the speeding-up, resulting in a severe heat generation of an actuator driver IC. Further, the change in the number of revolutions of the disk also becomes larger, and accordingly, heat generation in a spindle driver IC due to repetition of forced acceleration or forced deceleration of a spindle motor, or heat generation in a traverse driver IC due to high-speed movement of a traverse (thread) becomes severe.

When the driver IC is provided with the thermal shutdown function, the driver IC can be protected from breakage due to heat generation, but the optical disk device becomes uncontrollable while the thermal shutdown function is being operated.

The present invention is made to solve the above-mentioned problems and has for its object to provide an optical disk device which can exert a control for efficiently suppressing heat generation before driving of the optical disk device is impeded by heat generation of a driver IC for driving a recording/reproduction driving system of the optical disk device, and can perform a fast and stable operation within an allowable capacity of the driver IC.

SUMMARY OF THE INVENTION

According to the first aspect of the invention, there is provided an optical disk device for recording/reproducing data on/from an optical disk, comprising: a monitor circuit for monitoring a junction temperature of a chip of a driver IC for driving a recording/reproduction driving system, and a comparison circuit for comparing an output of the monitor circuit with an arbitrary set temperature and outputting a temperature flag as a comparison result, which circuits are included in the driver IC; and a CPU for controlling the operation of the entire optical disk device, as well as monitoring the temperature flag outputted from the comparison circuit, the CPU performing a control so as to continue driving of the optical disk device when the junction temperature is lower than the arbitrary set temperature, and performing a control so as to suppress heat generation of the driver IC when the junction temperature is equal to or higher than the arbitrary set temperature.

According to the optical disk device constructed as described above, the monitor circuit in the driver IC for driving the recording/reproduction driving system monitors the junction temperature of the driver IC chip, the comparison circuit compares the junction temperature of the driver IC chip monitored by the monitor circuit with the arbitrarily set temperature to output the temperature flag as the comparison result, and the CPU monitors the temperature flag. Therefore, heat generation of the driver IC can be suppressed with efficiency.

According to the second aspect of the invention, the optical disk device as defined in the first aspect includes: a spindle driver IC, a traverse driver IC, and an actuator driver IC as the driver IC.

According to the optical disk device constructed as described above, the spindle driver IC, the traverse driver IC and the actuator driver IC are included as the driver IC. Therefore, heat generation of the spindle driver IC, the traverse driver IC and the actuator driver IC can be suppressed with efficiency.

According to the third aspect of the invention, in the optical disk device as defined in the first or second aspect, the spindle driver IC internally has the monitor circuit and the comparison circuit, and a control for suppressing heat generation of the spindle driver IC is exerted so as not to perform a forced acceleration or forced deceleration of the optical disk for an arbitrary period of time.

According to the optical disk device constructed as described above, the monitor circuit and the comparison circuit are included in the spindle driver IC, and heat generation of the traverse driver IC is suppressed by controlling not to perform a forced acceleration or forced deceleration of the optical disk for an arbitrary period of time when the temperature thereof is equal to or higher than an arbitrary set temperature. Therefore, a recording/reproduction driving system of the optical disk can perform a fast and stable operation within an allowable range of losses of the spindle driver IC due to heat.

According to the fourth aspect of the invention, in the optical disk device as defined in any of the first to third aspects, the spindle driver IC internally has the monitor circuit and the comparison circuit, and a control for suppressing heat generation of the spindle driver IC is exerted so that a free run state of the optical disk is included with changes in revolution of the optical disk.

According to the optical disk device constructed as described above, the monitor circuit and the comparison circuit are included in the spindle driver IC, and heat generation of the spindle driver IC is suppressed by including a free run state of the optical disk with changes in the revolution of the optical disk when the temperature thereof is equal to or higher than an arbitrary set temperature. Therefore, the recording/reproduction driving system of the optical disk can perform a fast and stable operation within an allowable range of losses of the spindle driver IC due to heat.

According to the fifth aspect of the invention, in the optical disk device as defined in any of the first to fourth aspects, the actuator driver IC internally has the monitor circuit and the comparison circuit, and a control for suppressing heat generation of the actuator driver IC is exerted so as to reduce the number of revolutions of the optical disk.

According to the so-constituted optical disk device, the monitor circuit and the comparison circuit are included in the actuator driver IC, and heat generation of the actuator driver IC is suppressed by reducing the number of revolutions of the optical disk when the temperature thereof is equal to or higher than an arbitrary set temperature. Therefore, the recording/reproduction driving system of the optical disk can perform a fast and stable operation within an allowable range of losses of the actuator driver IC due to heat.

DETAILED DESCRIPTION OF THE INVENTION

Embodiment 1

Figure 1:
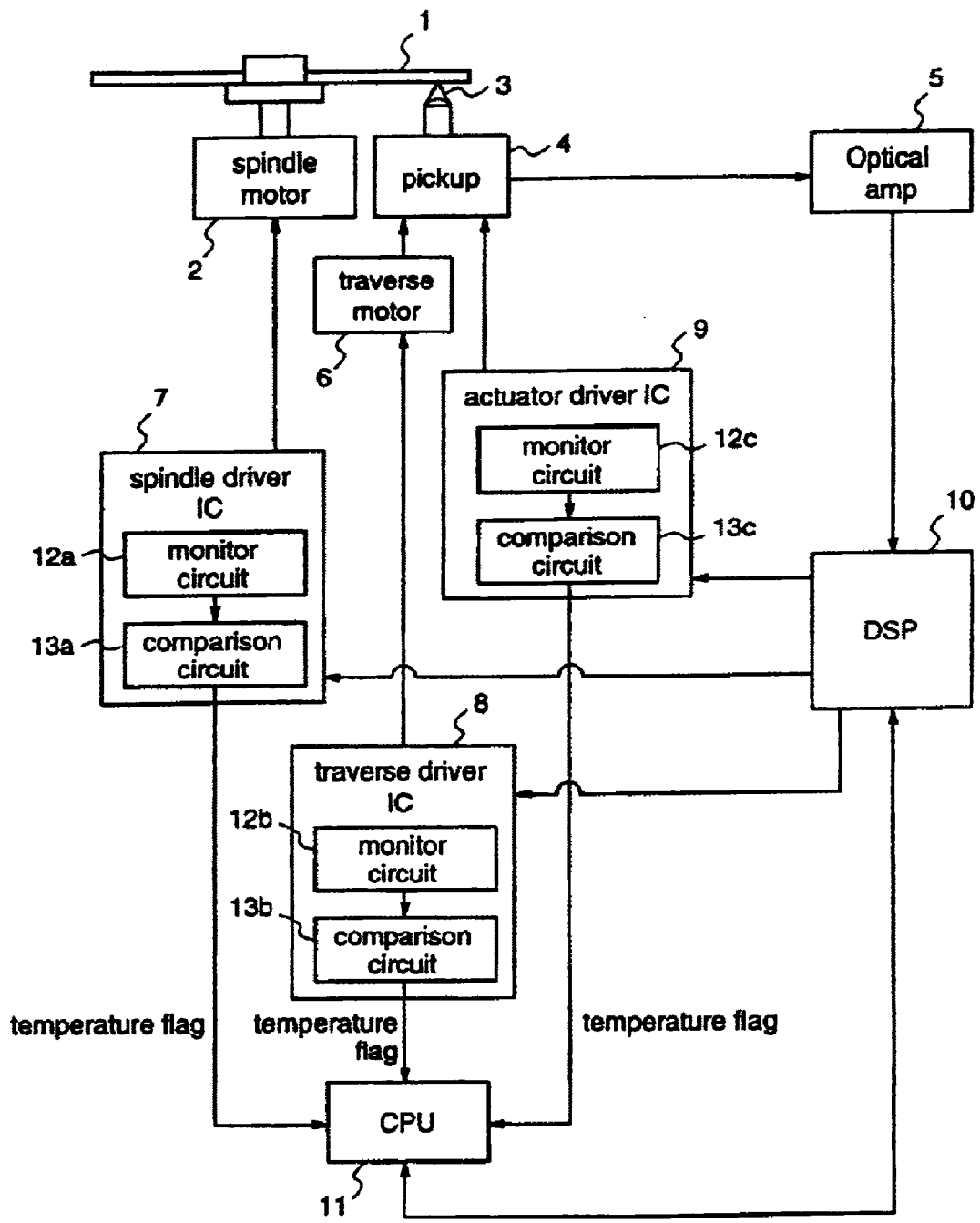
FIG. 1 is a block diagram illustrating an optical disk device according to a first embodiment of the present invention.

A structure of an optical disk device according to a first embodiment will be described with reference to FIG. 1.

FIG. 1 is a block diagram illustrating an optical disk device according to the first embodiment. In the figure, the optical disk device in the first embodiment comprises a disk 1, a spindle motor 2 for rotating the disk 1, an object lens 3 for detecting data on the disk 1, a pickup 4 including an actuator for controlling and driving the object lens 3 with high accuracy so as to follow data when data on the disk 1 are detected, an optical amp 5 as an optical amplifier, a traverse motor 6 for moving the pickup 4 in a radial direction of the disk 1, a spindle driver IC 7 as an IC for driving the spindle motor 2, a traverse driver IC 8 as an IC for driving the traverse motor 6, an actuator driver IC 9 as an IC for driving the actuator of the pickup 4, a DSP (Digital Signal Processor) 10 for performing servo control such as binarization or error handling of data detected from the disk 1 as well as controlling the spindle driver IC 7, the traverse driver IC 8 and the actuator driver IC 9, monitor circuits 12a, 12b and 12c for monitoring junction temperatures of the respective driver IC chips, comparison circuits 13a, 13b and 13c for comparing the junction temperatures of the respective chips monitored by the monitor circuits 12a, 12b and 12c with respective arbitrarily set temperatures to output temperature flags as comparison results, and a CPU 11 which exerts a control of the whole device, as well as monitors the temperature flags of the respective chips outputted from the comparison circuits to exert a control so as to suppress heat generation.

Next, the operation will be described. In FIG. 1, the junction temperatures of the respective chips of the spindle driver IC 7, the traverse driver IC 8 and the actuator driver IC 9 are monitored in the monitor circuits 12a, 12b and 12c in the driver ICs 7, 8 and 9, respectively, the monitored temperatures are compared with respective arbitrarily set temperatures in the comparison circuits 13a, 13b and 13c provided in the driver ICs 7, 8 and 9, respectively, and the comparison results are outputted to the CPU 11 as the temperature flags. Here, the above-described arbitrary temperatures are set in consideration of an allowable range of losses of the respective driver ICs 7, 8 and 9 due to heat. Further, when the respective driver ICs 7, 8 and 9 are provided with the thermal shutdown function, the arbitrary temperatures can be set on the basis of the conditions such as the set operating temperatures of the respective driver ICs.

The CPU 11 obtains the temperature states of the respective driver ICs by monitoring the temperature flags outputted from the comparison circuits 13a, 13b and 13c. On the basis of the temperature flags, when the driver ICs have higher temperatures than the respective arbitrarily set temperatures, a control signal is outputted to the DSP 10 so that the driver ICs 7, 8 and 9 do not generate any more heat, respectively. The DSP 10 which has received the control signal controls the revolution of the disk 1 together with the CPU 11, through the spindle driver IC 7, the traverse driver IC 8 or the actuator driver IC 9. For example, when the temperature of the spindle driver IC 7 becomes equal to or higher than the arbitrarily set temperature, the CPU 11 and the DSP 10 control the spindle driver IC 7 so that forced acceleration or forced deceleration of the disk 1 is not performed for an arbitrary period of time, whereby the motion of the spindle motor 2 is eased, and heat generation of the spindle driver IC 7 is suppressed. Or, a free run state of the disk 1 is included with changes in revolution of the disk 1, thereby suppressing the heat generation. Further, when the temperature of the traverse driver IC 8 becomes equal to or higher than the arbitrarily set temperature, a high-speed movement of traverse is eased while the pickup 4 is being on the traverse (thread) move to a target position, thereby suppressing heat generation of the traverse driver IC 8. Further, when the temperature of the actuator driver IC 9 becomes equal to or higher than the arbitrarily set temperature, the spindle driver IC 7 is controlled to reduce the number of revolutions of the disk 1, whereby the face wobbling or eccentricity of the disk 1 is lessened and the motion of the actuator for driving and controlling the object lens 3 which faces the disk 1 is eased, thereby suppressing heat generation of the actuator driver IC.

As described above, in the first embodiment, the monitor circuits 12a, 12b and 12c and the comparison circuits 13a, 13b and 13c are included in the respective driver ICs 7, 8 and 9, the junction temperatures of the respective chips are compared with arbitrarily set temperatures, and the temperature flags as the comparison results are outputted to the CPU 11 to monitor the temperature states of the respective driver ICs 7, 8 and 9. When the temperature of the spindle driver IC 7 becomes equal to or higher than an arbitrarily set temperature, the spindle driver IC 7 is controlled so as not to perform forced acceleration or forced deceleration of the disk 1 for an arbitrary period of time. When the temperature of the traverse driver IC 8 becomes equal to or higher than an arbitrarily set temperature, the high-speed movement of traverse is eased. When the temperature of the actuator driver IC 9 becomes equal to or higher than an arbitrarily set temperature, the spindle driver IC 7 is controlled so as to reduce the number of revolutions of the disk 1. Therefore, the respective driver ICs 7, 8, and 9 can be controlled so that a recording/reproduction driving system of the optical disk device can perform a fast and stable operation within the allowable capacities of the respective driver ICs and the allowable losses of the respective driver ICs due to heat.

While in the first embodiment the description is given of the case where the optical disk device has the monitor circuit 12 and the comparison circuit 13 in each of the spindle driver IC 7, the traverse driver IC 8 and the actuator driver IC 9, the optical disk device may have the monitor circuit 12 and the comparison circuit 13 in at least one of the driver ICs 7, 8 and 9. Also in this case, almost the same effects as described above are achieved.

APPLICABILITY IN INDUSTRY

The optical disk device according to the present invention, can be used as an optical disk device which can suppress heat generation of the respective driver ICs and enables a recording/reproduction driving system to perform a fast and stable operation within the allowable range of losses of the driver ICs due to heat, in a state where speeding-up of optical disk devices are further progressed.

What is claimed is:

1. An optical disk device for recording/reproducing data on/from an optical disk, the optical disk device comprising:
   a spindle driver IC internally including a monitor circuit for monitoring a junction temperature of a chip of the spindle driver IC and
   a comparison circuit for comparing an output of the monitor circuit with an arbitrary set temperature and outputting a temperature flag as a comparison result;
   a traverse driver IC;
   an actuator driver IC; and
   a CPU for controlling the operation of the optical disk device and monitoring the temperature flag outputted from the comparison circuit, the CPU performing a control so as to continue driving of the optical disk device when the junction temperature is lower than the arbitrary set temperature, and performing a control so as to suppress heat generation of the spindle driver IC when the junction temperature of the chip of the spindle driver IC is equal to or higher than the arbitrary set temperature by not having the spindle driver IC perform a forced acceleration or a forced deceleration of the optical disk for an arbitrary period of time.

2. The optical disk device as defined in claim 1 wherein the CPU also performs a control for suppressing heat generation of the spindle driver IC by entering a free run state of the optical disk.

3. The optical disk device as defined in claim 2, wherein the actuator driver IC internally includes an additional monitor circuit for monitoring a junction temperature of a chip of the actuator driver IC and an additional comparison circuit for comparing an output of the additional monitor circuit with an arbitrary set temperature and outputting a temperature flag as a comparison result, and
the CPU exerts a control for suppressing heat generation of the actuator driver IC when the junction temperature of the chip of the actuator driver IC is equal to or higher than the arbitrary set temperature by reducing a number of revolutions of the optical disk.

4. The optical disk device as defined in claim 3, wherein the traverse driver IC internally includes a second additional monitor circuit for monitoring a junction temperature of a chip of the traverse driver IC and a second additional comparison circuit for comparing an output of the second additional monitor circuit with an arbitrary set temperature and outputting a temperature flag as a comparison result, and
the CPU exerts a control for suppressing heat generation of the traverse driver IC when the junction temperature of the chip of the traverse driver IC is equal to or higher than the arbitrary set temperature by reducing a high-speed movement of traverse of a pickup.

5. The optical disk device as defined in claim 2, wherein the traverse driver IC internally includes an additional monitor circuit for monitoring a junction temperature of a chip of the traverse driver IC and an additional comparison circuit for comparing an output of the additional monitor circuit with an arbitrary set temperature and outputting a temperature flag as a comparison result, and
the CPU exerts a control for suppressing heat generation of the traverse driver IC when the junction temperature of the chip of the traverse driver IC is equal to or higher than the arbitrary set temperature by reducing a high-speed movement of traverse of a pickup.

6. The optical disk device as defined in claim 1, wherein the actuator driver IC internally includes an additional monitor circuit for monitoring a junction temperature of a chip of the actuator driver IC and an additional comparison circuit for comparing an output of the additional monitor circuit with an arbitrary set temperature and outputting a temperature flag as a comparison result, and
the CPU exerts a control for suppressing heat generation of the actuator driver IC when the junction temperature of the chip of the actuator driver IC is equal to or higher than the arbitrary set temperature by reducing a number of revolutions of the optical disk.

7. The optical disk device as defined in claim 6, wherein the traverse driver IC internally includes a second additional monitor circuit for monitoring a junction temperature of a chip of the traverse driver IC and a second additional comparison circuit for comparing an output of the second additional monitor circuit with an arbitrary set temperature and outputting a temperature flag as a comparison result, and
the CPU exerts a control for suppressing heat generation of the traverse driver IC when the junction temperature of the chip of the traverse driver IC is equal to or higher than the arbitrary set temperature by reducing a high-speed movement of traverse of a pickup.

8. The optical disk device as defined in claim 1, wherein the traverse driver IC internally includes an additional monitor circuit for monitoring a junction temperature of a chip of the traverse driver IC and an additional comparison circuit for comparing an output of the additional monitor circuit with an arbitrary set temperature and outputting a temperature flag as a comparison result, and
the CPU exerts a control for suppressing heat generation of the traverse driver IC when the junction temperature of the chip of the traverse driver IC is equal to or higher than the arbitrary set temperature by reducing a high-speed movement of traverse of a pickup.

* * * * *